No. 886,306.

PATENTED APR. 28, 1908.

R. J. OWENS.
GRAIN SEPARATOR.
APPLICATION FILED JUNE 18, 1906.

2 SHEETS—SHEET 1.

WITNESSES

INVENTOR
ROBERT J. OWENS
BY Paul & Paul
HIS ATTORNEYS

No. 886,306. PATENTED APR. 28, 1908.
R. J. OWENS.
GRAIN SEPARATOR.
APPLICATION FILED JUNE 18, 1906.

2 SHEETS—SHEET 2.

WITNESSES
OMWalstrom
J. B. Eva

INVENTOR
ROBERT J. OWENS
BY Paul & Paul
HIS ATTORNEYS

ROBERT J. OWENS, OF MINNEAPOLIS, MINNESOTA.

GRAIN-SEPARATOR.

No. 886,306.　　　　　　Specification of Letters Patent.　　　Patented April 28, 1908.

Application filed June 18, 1906. Serial No. 322,157.

*To all whom it may concern:*

Be it known that I, ROBERT J. OWENS, of Minneapolis, Hennepin county, Minnesota, have invented certain new and useful Improvements in Grain-Separators, of which the following is a specification, The primary object of my invention is to provide a machine for separating one kind of grain from another and particularly to provide a machine that is adapted for separating wheat from oats, grains that are frequently grown together in a mixture commonly known as "succotash".

A further object is to provide a machine of the character described, of a large capacity, and one that will make a very rapid and efficient separation of the wheat and oat kernels Other objects of the invention will appear from the following detailed description.

The invention consists generally in providing an apron arranged to lie upon the surface of a sieve, and having a series of perforations through which the kernels of grain pass on to the surface of the sieve beneath.

Further, the invention consists in providing shields or guards overhanging the perforations to prevent the oat kernels as they fall from one sieve from dropping through the perforations in the apron and sieve beneath.

Further, the invention consists in the various constructions and combinations, hereinafter described and particularly pointed out in the claims.

Figure 1:
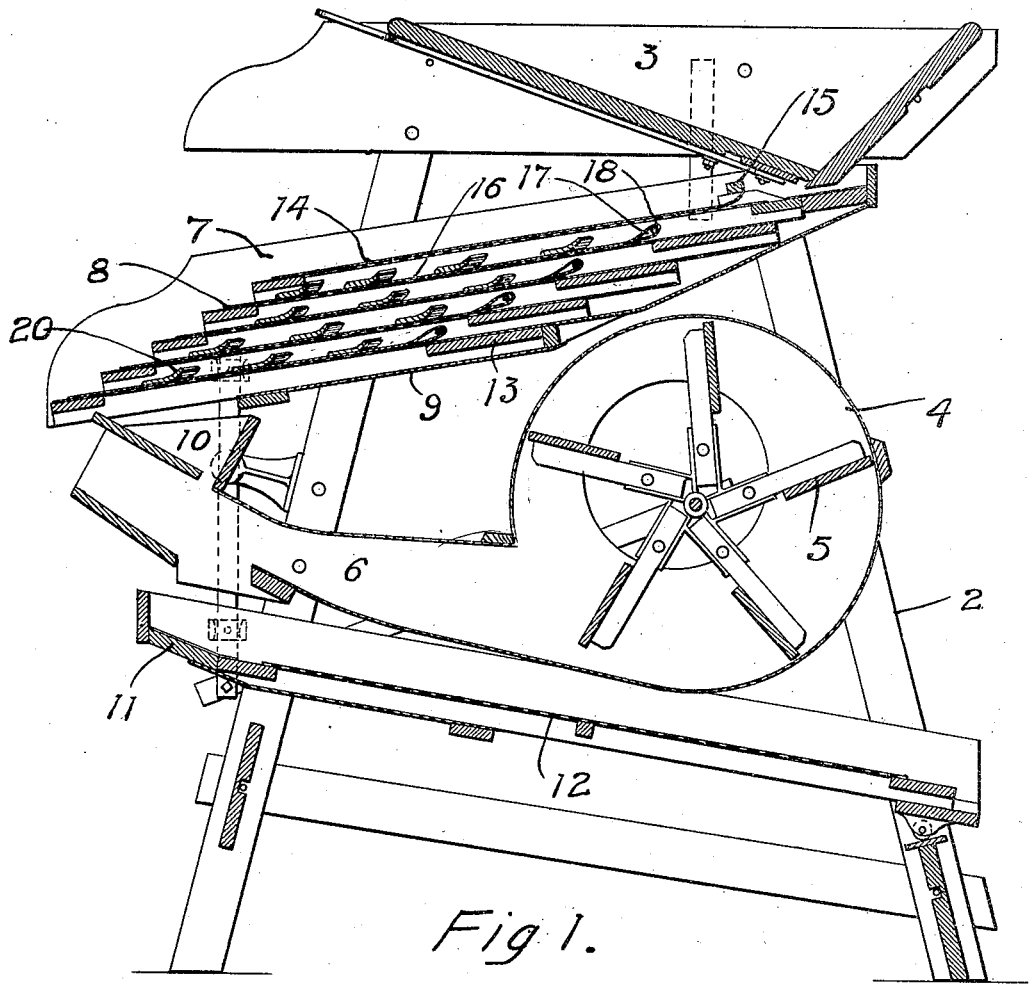
Figure 6:
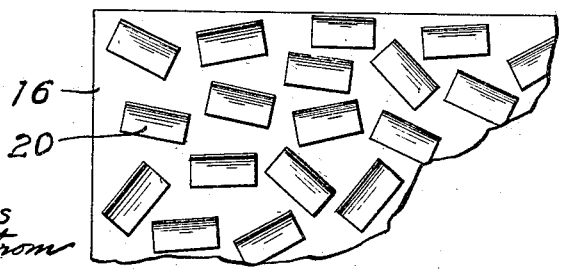
Figure 2:
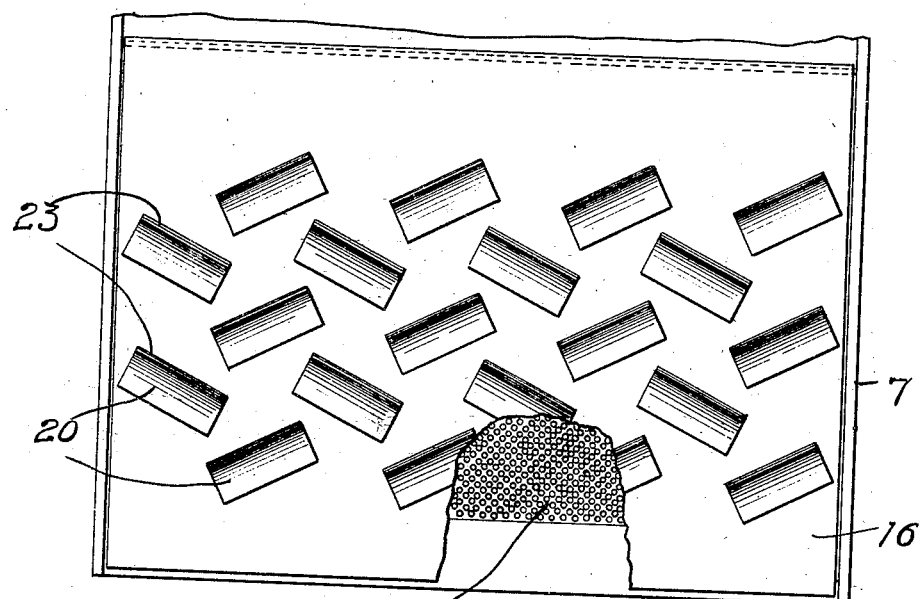
Figure 3:
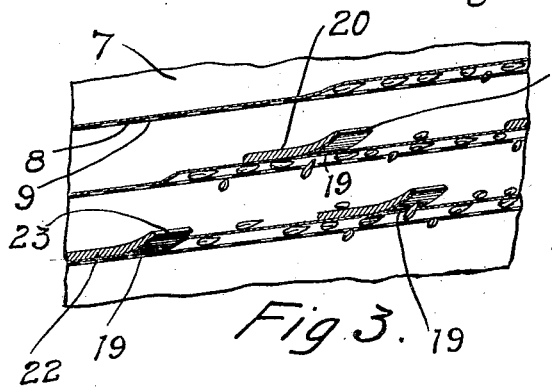
Figure 4:
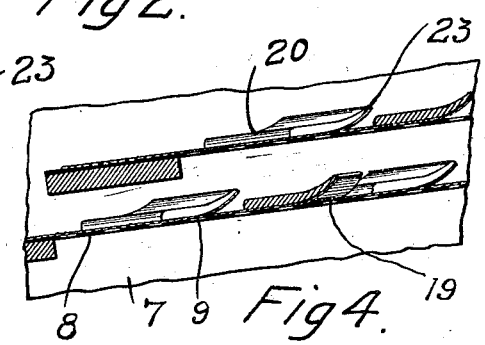
Figure 5:
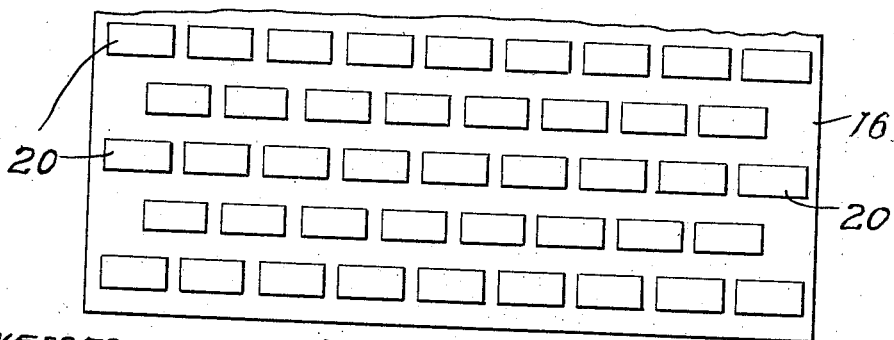

In the accompanying drawings, forming part of this specification; Figure 1 is a longitudinal, vertical section of a fanning mill separator embodying my invention. Fig. 2 is a plan view of a portion of one of the sieves showing the apron in place thereon. Fig. 3 is a detail sectional view through several of the sieves showing the manner of separating the wheat from the oats. Fig. 4 is a similar view showing the shields arranged irregularly upon the sieve. Fig. 5 is a plan view of a portion of one of the aprons showing the shields arranged in horizontal rows across the apron. Fig. 6 is a detail showing a modified arrangement of the perforations in the apron.

In the drawings, 2 represents the frame of the mill having a hopper 3, a fan casing 4 inclosing a suitable fan 5, and an air trunk 6.

7 is the upper shoe of the mill in which is arranged a series of sieves 8. These sieves are of ordinary construction and are formed of sheets of perforated zinc or other suitable sheet metal. Below the lower sieve I preferably arrange a deck 9, by which the material passing through the lower sieve is conducted to a chute 10 formed in the air trunk 6 so that the material passing through said chute falls through the air trunk and is subjected to the air blast therein. The underside of the trunk is provided with an opening which is above the lower shoe 11. This shoe is provided with one or more screens 12 and the material that reaches this shoe passes over the screen 12 and the fine seeds and other fine material pass through this screen and falls onto the floor below. The tailings from this screen pass off the rear end of the shoe. Each of the sieves 8 is provided with a separate sieve frame having preferably a deck section 13 at its upper end and said sieves are preferably arranged, as shown, with the lower end of each sieve projecting beyond the lower end of the sieve above, this being a common arrangement in fanning mills.

The sieves are of the well known zinc or sheet metal type provided with the usual perforations of sufficient size to allow a wheat kernel to drop through, but too small to permit the passage of an oat kernel, unless it stands on end.

The difference in the shape of wheat and oat kernels is utilized in this machine to effect the separation between them, it being my object to allow the wheat kernels to fall through the sieves, while the oats pass on down over them and are discharged at their lower ends.

In passing a body of the mixed grain down over the sieves, it is evident that if the holes are large enough to allow the wheat to fall through and too small to admit the oats, except in an endwise position, that a partial separation will take place on each sieve, but as many of the oat kernels would, through the oscillation of the sieves and the movement of the grain, be tipped up endwise and allowed to pass through the sieves, it is desirable to provide some means for holding the oat kernels flatwise upon the sieves until they reach the lower or discharge ends thereof. With this end in view I provide an imperforate apron 14 hung on a cross bar 15 near the receiving end of the upper sieve and just below the feed opening of the hopper. This apron may be of any suitable material, preferably canvas or oil cloth, and it rests upon the top of the upper sieve extending preferably down to the discharge end thereof. The weight of this apron exerts sufficient pressure to prevent most of the oat kernels from turning up endwise and dropping through the holes in the sieve beneath. The discharge from the hopper will fall upon the upper sieve above the apron 14, and a portion of the material will pass through the head end of the upper sieve and fall onto the head end deck of the sieve beneath, while the remainder will pass under the apron 14 and work down over the surface of the upper sieve. The grain that falls through the upper sieve upon the one next beneath will contain a certain percentage of oats, and to effect a separation on this sieve I provide an apron 16, preferably similar to the apron 14, except that it is provided with a series of perforations, for the purpose hereinafter set forth. This apron is preferably provided at its upper end with a loop 17, through which passes a small rod or wire 18, the ends of said wire being secured to the side rails of the sieve, by which means the apron is held in position on the top of the sieve, while at the same time is permitted a slight "shucking" or back and forth oscillating movement on the sieve surface as the shoe and sieves carried thereby are reciprocated. In the apron 16 I provide a series of perforations 19 (see Fig. 3) and these perforations may be arranged irregularly or "hit-or-miss" in the surface of the apron, as shown in Fig. 6 or they may be arranged in horizontal rows extending across the apron, as shown in Fig. 5. The openings are preferably arranged in alternating series, as shown in Fig. 5, so that the imperforate space between two perforations is opposite one of the perforations in the next row. The perforations may be arranged in straight lines across the apron, or they may be arranged in diagonal positions, as shown in Fig. 2 of the drawings. No regularity need be followed in placing the perforations in the apron. It is only necessary that there be a sufficient number of such perforations to permit the grain to readily reach the surface of the sieve beneath the apron.

An apron 16, similar to the one already described, is preferably provided on each of the sieves below the top one. Each apron rests upon its sieve and tends to hold the kernels of oats flatwise thereon, while allowing the wheat kernels to slip through and drop from one sieve to the other.

I do not wish to confine myself to the arrangement of the perforations shown in the drawings, nor to their number, shape or size, as the same are capable of considerable modification to suit the various conditions surrounding the use of the machine. These perforations, as indicated in Fig. 3, allow the grain that falls upon the apron from the sieve above to pass through onto the surface of the sieve beneath, the oat kernels being held flatwise and sliding down over the sieve, while the wheat kernels and a few of the oats, pass through the holes in the sieves and fall upon the perforate apron beneath. The second perforate apron has the same functions as the first and effects a still further separation of the wheat from the oats, the operation being continued to the bottom of the bank of sieves, where it will be found that a very efficient separation has taken place.

To guide the oat kernels into the perforations and prevent any from dropping down vertically and passing, while in a vertical position, through the perforations in the apron and coinciding hole in the sieve beneath, I prefer to provide shields or guards 20 that overhang the perforations in the apron and present inclined surfaces to the falling oat kernels to divert them from a vertical to a horizontal position, should any of the kernels strike directly upon the shields above the perforations. If they fall upon an imperforate portion of an apron, they will, of course, drop down to a horizontal position and slide down over the apron, enter one of the perforations and continue a downward movement to the end of the sieve between the upper sieve surface and the lower surface of the sieve.

The shields, which I prefer to provide, are shown in Figs. 1, 2, 3 and 4, and consist of blocks 22 secured to the surfaces of the aprons and having upwardly turned lips or wings 23 that overhang the slots 19 therein and cover them sufficiently to prevent the grain from falling directly into the perforations from the sieve above. Should any of the oat kernels falling through an upper sieve strike upon the inclined surface of the wing or shield over a perforation, it will be deflected to a horizontal position on the apron and work down over it to one of the lower perforations, entering it from the upper side, and thence will pass on beneath the apron to the lower end of the sleeve. If by chance any oat kernel in entering a perforation should be tipped up endwise entering the sieve, it will be caught by the apron beneath and will be finally discharged over the end of the sieve before reaching the bottom of the series. Should an oat kernel fall upon an apron above a row of perforations, it will either pass into one of them as it slides down over the apron, or if it misses the perforations in one row, will be caught by those in the next row.

The shields shown in Figs. 1, 2, 3 and 4 are preferably of wood, but may be made of any other suitable material if preferred.

The slots or perforations may be disposed in any manner over the apron and the slots or perforations in one apron may differ from those in another, it being only necessary that there should be a sufficient number of slots or perforations in each apron to permit the grain to be fed therethrough to the surface of the sieve below.

It will be understood that the more the grain is kept in contact with the sieve surfaces, the more perfect the separation will be; at the same time the aprons must be sufficiently continuous to hold the grain flat upon the surface of each sieve.

I do not limit myself to the details of the construction shown and described as the same may be varied in many particulars without departing from my invention.

I claim as my invention:

1. In a grain separator, the combination, with a sieve, of an apron, flexible throughout its extent, and provided with a series of irregularly disposed feed-openings extending through it, said apron being secured at its upper edge and resting freely upon said sieve and means for delivering grain to said apron.

2. In a grain separator, the combination, with a sieve, of an apron flexible throughout its extent, and provided with a series of feed-openings extending through it, said apron being secured by a loose connection at its upper edge and resting freely upon said sieve and means for delivering the grain to the upper surface of said apron.

3. In a grain separator, the combination, with a sieve, of an apron, flexible throughout its extent, and provided with a series of feed-openings extending through it, said apron being secured at its upper edge and resting freely upon said sieve and means for delivering the grain to said apron.

4. In a grain separator, the combination, with a sieve, of a flexible apron provided with a series of feed-openings extending through it, the upper edge of said apron being secured above said sieve and said apron resting freely upon said sieve with the under exits of the openings through the apron practically in the plane of the sieve and a screen wherefrom the grain is delivered to said apron.

5. In a grain separator, the combination, with a sieve, of a flexible apron, provided with a series of feed-openings extending through it, said apron being secured at its upper edge and resting freely upon said sieve, and means provided upon said apron for preventing grain from falling directly into said feed-openings and a screen arranged to deliver the grain to said apron.

6. In a grain separator, the combination, with a sieve, of a flexible apron secured above and resting upon the sieve, and provided with a series of feed-openings extending through it, and shields or guards arranged upon said openings and extending over said feed-openings and means for delivering the grain to said apron.

7. In a grain separator, the combination, with a series of sieves, arranged one above another, of a flexible apron secured above and resting upon each of said sieves, each apron being provided with a series of feed-openings extending through it, whereby grain passing through one sieve reaches the surface of the sieve below through the feed-openings in the apron resting thereon.

8. In a grain separator, the combination, with a series of sieves, arranged one above another, of a flexible apron secured above and resting upon each of said sieves, each apron being provided with a series of feed-openings extending through it, and shields or guards overhanging said feed-openings, for the purpose set forth.

In witness whereof, I have hereunto set my hand this 14 day of June 1906.

ROBERT J. OWENS.

Witnesses:
RICHARD PAUL,
J. B. ERA.